US 7,216,546 B2

(12) United States Patent
Hayashi et al.

(10) Patent No.: US 7,216,546 B2
(45) Date of Patent: May 15, 2007

(54) PRESSURE SENSOR HAVING INTEGRATED TEMPERATURE SENSOR

(75) Inventors: Kyutaro Hayashi, Takahama (JP); Keiji Horiba, Nishikasugai-gun (JP)

(73) Assignee: Denso Corporation, Kariya (JP)

( * ) Notice: Subject to any disclaimer, the term of this patent is extended or adjusted under 35 U.S.C. 154(b) by 54 days.

(21) Appl. No.: 11/087,759

(22) Filed: Mar. 24, 2005

(65) Prior Publication Data

US 2005/0210990 A1    Sep. 29, 2005

(30) Foreign Application Priority Data

Mar. 25, 2004    (JP)    ............... 2004-089163

(51) Int. Cl.
*G01L 19/04*    (2006.01)
(52) U.S. Cl. .......................... 73/708; 73/717
(58) Field of Classification Search ................ 73/708, 73/717, 700, 716, 723, 720, 721
See application file for complete search history.

(56) References Cited

U.S. PATENT DOCUMENTS

| | | | |
|---|---|---|---|
| 5,386,730 A * | 2/1995 | Ikeda et al. | 73/706 |
| 5,449,535 A * | 9/1995 | Streater | 427/582 |
| 5,661,244 A * | 8/1997 | Nishimura et al. | 73/706 |
| 5,948,989 A * | 9/1999 | Ichikawa et al. | 73/708 |
| 6,003,379 A * | 12/1999 | Ichikawa et al. | 73/708 |
| 6,141,020 A * | 10/2000 | Larson | 345/501 |
| 6,212,946 B1 | 4/2001 | Naegele et al. | |
| 6,272,913 B1 | 8/2001 | Naegele et al. | |
| 6,439,056 B1 * | 8/2002 | Jonsson | 73/708 |
| 2003/0041613 A1 | 3/2003 | Kasagi et al. | |
| 2004/0134282 A1 | 7/2004 | Hayashi et al. | |

OTHER PUBLICATIONS

Office Communication issued from French Patent Office issued on Nov. 18, 2005 for the corresponding French patent application No. 20050283400 (a copy thereof).

* cited by examiner

*Primary Examiner*—Andre J. Allen
(74) *Attorney, Agent, or Firm*—Posz Law Group, PLC

(57) ABSTRACT

A pressure sensor includes a case, terminals, a pressure sensing element, a port, and a temperature sensing element. The terminals are assembled to the case by insert molding and connectable to an external device. The pressure sensing element is electrically connected with the terminals and housed in the case. The port having a pressure receiving hole through which a pressure transmitting medium is led to the pressure sensing element is connected with the case. The temperature sensing element is electrically connected with the terminals and arranged in the pressure receiving hole. A part of each terminal is passed through the pressure receiving hole and extended to the temperature sensing element. The extended part is electrically connected to the temperature sensing element. The extending portion is formed as an insert molding portion of the case and held with a material forming the case.

6 Claims, 2 Drawing Sheets

PRESSURE SENSOR HAVING INTEGRATED TEMPERATURE SENSOR

CROSS REFERENCE TO RELATED APPLICATION

This application is based on and incorporates herein by reference Japanese Patent Application No. 2004-89163 filed on Mar. 25, 2004.

FIELD OF THE INVENTION

The present invention relates to a pressure sensor having an integrated temperature sensor.

BACKGROUND OF THE INVENTION

A pressure sensor having an integrated temperature sensor is proposed in JP-A-2003-75019 and shown in FIG. 4. The pressure sensor 900 is used in a vehicle for measuring pressures in an intake manifold and intake air temperatures. An engine of the vehicle is controlled based on signals indicating the measurements.

A sensor case 910 houses a mold IC 921 including a pressure sensing element 920 that detects pressures. The mold IC 921 is electrically connected to terminals 911 via a lead frame 922. The terminals 911 are provided for outputting pressure signals to an external processing circuit. A port 930 is connected to the case 910 such that a pressure sensing chamber is defined with the case 910 and the port 930. The port 930 has two pressure receiving holes 931 that are formed by dividing the inside of the port 930 with a dividing plate 932.

One of the pressure receiving holes 931 is provided as a medium leading hole 931a through which a pressure transmitting medium is led to the pressure sensing element 920. The other pressure receiving hole 931 is provided as a temperature sensing element housing hole 931b in which a lead wires 924 are arranged. The lead wires 924 are electrically and mechanically connected to the terminals 911 by welding. A temperature sensing element 940 is arranged at about ends of the lead wires 924.

A resin shock absorbing member 925 is arranged in the temperature sensing element housing hole 931b around the lead wires 924 for reducing vibrations of the temperature sensing element 940 and the lead wires 924. If the shock absorbing member 925 is not provided, the temperature sensing element 940 is only supported by the lead wires 924. As a result, the temperature sensing element 940 swings with a connecting point 923 between the lead wires 924 and the terminal 911 as a supporting point when the pressure sensor 900 vibrates.

In such a case, stress is repeatedly applied to the connecting point 923, and the lead wires 924 touch an inner wall of the port 930. As a result, the lead wires 924 are damaged. The lead wires 924 are fixedly supported by the shock absorbing member 925. Thus, the swinging motions of the temperature sensing element 940 and the lead wires 924 are reduced, and their resistance can be improved.

The lead wires 924 are covered with a tube or a coating member for protection from corrosion or grime such that it is not bare in a measurement environment. The connecting point is covered with a potting member 926 for protection. Namely, the pressure sensor 900 requires the tube or the coating member for protecting the lead wires 924, the potting member 926 for protecting the connecting point 923, and the shock absorbing member 925 for supporting the lead wires 924. The lead wires 924 require a complicated configuration for ensuring the vibration resistance of the temperature sensing element 940.

SUMMARY OF THE INVENTION

The present invention therefore has an objective to provide a pressure sensor having an integrated temperature sensor, in which vibrations of a temperature sensing element are suppressed with a simple configuration. A pressure sensor of the present invention has a case, terminals, a pressure sensing element, a port, and a temperature sensing element.

The terminals are assembled to the case by insert molding and connectable to an external device. The pressure sensing element that detects pressures is electrically connected with the terminals and housed in the case. The port having a medium leading hole through which a pressure transmitting medium is led to the pressure sensing element is connected with the case. The temperature sensing element that detects temperatures of the pressure transmitting medium is electrically connected with the terminals and arranged in the medium leading hole.

A part of each terminal is passed through the pressure receiving hole and extended to the temperature sensing element. The part is referred to as an extending portion. The extending portion is electrically connected to the temperature sensing element. The extending portion is formed as an insert molding portion of the case and held with a material forming the case. With this configuration, the extending portions of the terminals function as lead wires. Therefore, lead wires are not required and connecting points of the lead wires are eliminated.

The extending portions are held with the material forming the case. Thus, they are protected from corrosion or grime, and reinforced. The resistance of the extending portions to vibrations and environment is ensured. Moreover, the extending portions are easily formed at the same time when the case is formed. Thus, the potting members around bases of the extending portions or supporting members for supporting the extending portions, such as a shock absorbing member 925 shown in FIG. 4, are not necessary. With this configuration, vibrations of a temperature sensing element are suppressed with a simple configuration.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
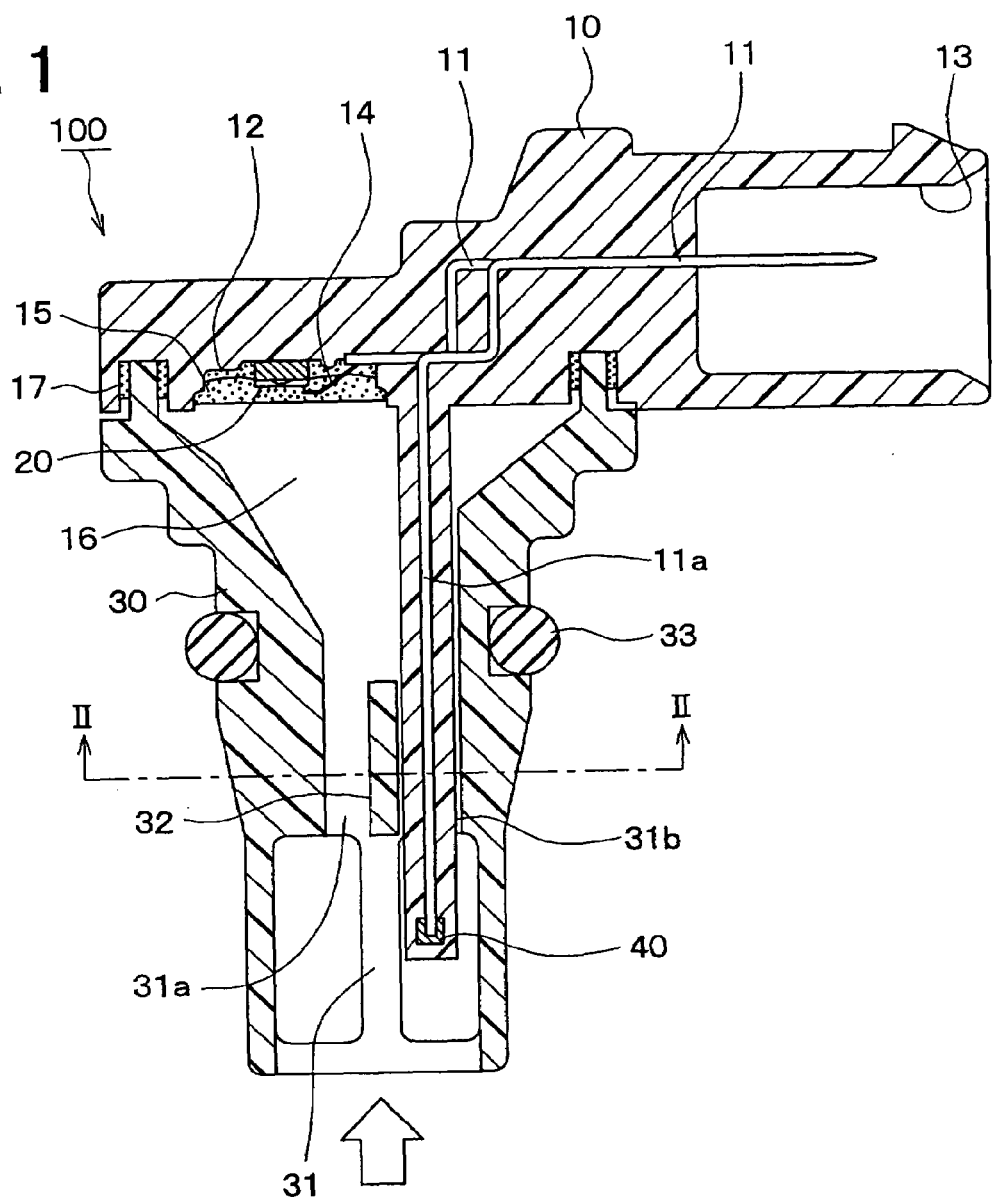
FIG. 1 is a cross-sectional view of a pressure sensor according to an embodiment of the present invention.
Figure 2:
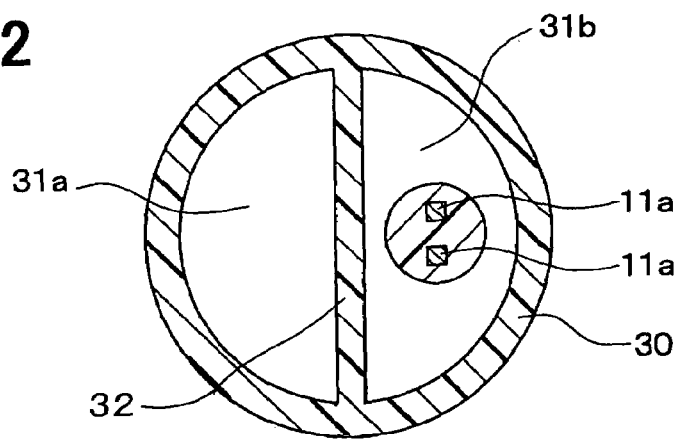
FIG. 2 is a cross-sectional view of a port in the pressure sensor sectioned by an A—A line of FIG. 1.

The preferred embodiments of the present invention will be explained with reference to the accompanying drawings. In the drawings, the same numerals are used for the same components and devices.

Referring to FIG. 1, a pressure sensor 100 includes a sensor case 11, terminals 11, a pressure sensing element 20, a port 30, and a temperature sensing element 40. The terminals 11 are connectable to an external device and assembled to the case 10 by insert molding. The pressure sensing element 20 detects pressures. It is electrically connected to the terminals 11, and is fixed to and housed in the case 10. The port 30 has a pressure receiving hole 31 through which a pressure transmitting medium is led to the pressure sensing element 20. The temperature sensing element 40 detects temperatures of the pressure transmitting medium. It is arranged in the pressure receiving hole 31 and electrically connected with the terminals 11.

The case 10 is made of resin, such as polyphenylene sulfide (PPS), polybutylene terephthalate (PBT), and epoxy resin. The case 10 has a recess 12 in which the pressure sensing element 20 is arranged. The terminals 11 are made of a conductive material, such as copper and 42-alloy. An end of the first terminal 11 is exposed at the recess 12. The exposed portion of the terminal 11 is gold-plated such that it functions as a bonding pad. The other end of the first terminal 11 and an end of the second terminal 11 are exposed at an opening 13 of the case 10. The ends are connectable to external devices including connectors (not shown). A part of the case around the opening 13 and the ends of the terminals 11 function as a connector of the pressure sensor 100.

The pressure sensing element 20 detects pressures and outputs electrical signals corresponding to the pressure levels. It is constructed of a semiconductor sensor chip and a glass base that supports the sensor chip. The sensor chip is a known chip using piezoresistance effect, a diaphragm, and a bridge circuit although it is not limited to such a kind. The diaphragm deforms when a pressure is applied to its top surface. The bridge circuit is constructed of diffused resistors.

The pressure sensing element 20 is bonded to the bottom of the recess 12 with an adhesive, such as a silicone rubber (not shown). Input and output terminals (not shown) of the pressure sensing element 20 are electrically connected to the bonding pads of the terminals 11 via bonding wires 14 made of gold or aluminum. The pressure sensing element 20 is electrically connected to the terminals 11 and housed in the case 10.

The recess 12 is filled with a sealing member 15 that has electrical insulation and chemical resistance, such as fluorine gel and fluorine rubber. The sealing member 15 seals gaps between the terminals 11 and the case 10, and shields the pressure sensing element 20 and the bonding wires 14. The pressure sensing element 20, the terminals 11, the bonding wires 14, connecting points between the pressure sensor 20 and the bonding wires 14, and connecting points between the terminals 11 and the bonding wires 14 are covered with the sealing members 15, protected from chemicals, electrically insulated, and protected from corrosion.

The sealing member 15 has two-layer structure. The lower layer is made of high-modulus material having chemical resistance for reducing bubbles from the gaps between the terminals 11 and the case 10. Fluorine based rubber may be used for the lower layer of the sealing member 15. The upper layer is made of low-modulus material having chemical resistance for applying less stress to the pressure sensing element 20 and the bonding wires 14. Fluorine based gel or fluorosilicone gel may be used for the lower layer of the sealing member 15.

The port 30 is connected to the case 10 such that it covers the recess 12. A pressure sensing chamber 16 is defined by the case 10 and the port 30. The port 30 is made of resin having thermal resistance, such as PBT and PPS. The case 30 is fixed to the case 10 with an adhesive 17 having high chemical resistance and elasticity. Hard epoxy resin may be used for the adhesive 17. The port 30 projects from the case 10 and has a pressure receiving hole 31 that runs from its end to the pressure sensing chamber 16.

The pressure receiving hole 31 is divided into two sections by a dividing plate 32. The dividing plate 32 is arranged along a path in which the pressure transmitting medium is led, which is indicated with a white arrow in FIG. 1. A one of sections of the pressure receiving hole 31 is used as a medium leading hole 31a through which the pressure transmitting medium is led to a pressure receiving surface of the pressure sensing element 20 for measuring pressures. The other section is used as a temperature sensing element housing hole 31b in which the temperature sensing element 40 is arranged.

An O-ring 33 is arranged around the port 30. The pressure sensor 100 is airtightly mountable to a sensor mounting portion of a subject (not shown). The medium leading hole 31a and the temperature sensing element housing hole 31b join to the pressure sensing chamber 16 inside the port 30. The dividing plate 32 is integrally formed with the port 30 when the port 30 is formed.

A part of each terminal 11 is passed through the pressure receiving hole 31 and extended to the temperature sensing element 40. The extended part of the terminal 11 is referred to as an extending portion 11a. The temperature sensing element 40 is electrically connected to an end of the extending portion 11a of each terminal 11.

The extending portion 11a is formed by bending a part of the terminal 11 and finished such that it can pass through the pressure receiving hole 31. The terminals 11 are arranged such that the extending portions 11a pass through the temperature sensing element housing hole 31b. The extending portions 11a are assembled to the case by insert molding, that is, formed as inserting molding portions of the case 10, and held with the material forming the case 10.

The temperature sensing element 40 is a regular thermistor element. It is electrically connected to the extending portions 11a with solder. The extending portions 11a are assembled to the case 10 by insert molding and held with the material forming the case 10. The temperature sensing element 40 is shielded by the material forming the case 10. The case 10 is prepared by connecting the temperature sensing element 40 to the ends of the extending portions 11a and molding with the terminals 11.

A method for manufacturing the pressure sensor 100 will be discussed. The case 10 is prepared by connecting the temperature sensing element 40 to the ends of the extending portions 11a and molding with the terminals 11. The pressure sensing element 20 is fixed to the case 10 in the recess 12 with an adhesive. The bonding wires 14 are connected between the terminals 11 and the pressure sensing element 20 for connecting the pressure sensing element 20 with the terminals 11 via the bonding wires 14. The sealing member 15 is injected into the recess 12 such that the recess 12 is filled with the sealing member 15, and thermally hardened through a thermosetting process.

The port 30 is fixed to the case 10 with the adhesive 17 for connecting the port 30 with the case 10 such that the extending portions 11a are inserted into the temperature sensing element housing hole 31b. Then, the pressure sensor 100 is completed.

The pressure sensor 100 can be used as an intake air pressure sensor for an intake manifold of a vehicle. In this case, the pressure sensor 100 is installed in the vehicle such that the pressure receiving hole 31 communicates with the intake manifold for detecting intake air pressures (negative pressures) by the pressure sensing element 20.

A pressure transmitting medium is led to the pressure receiving surface of the pressure sensing element 20 through the medium leading hole 31a when a pressure is applied toward inside the pressure sensor 100 as indicated with the white arrow. The pressure sensing element 20 detects the pressure and outputs an electrical signal corresponding to the level of the pressure. The electrical signal is outputted to an external device via the bonding wire 14 and the terminal 11. A temperature of the pressure transmitting medium is detected by the temperature sensing element 40 arranged near a path of the pressure transmitting medium. A signal indicating the detected temperature is outputted to an external device via the extending portion 11a.

Figure 4:
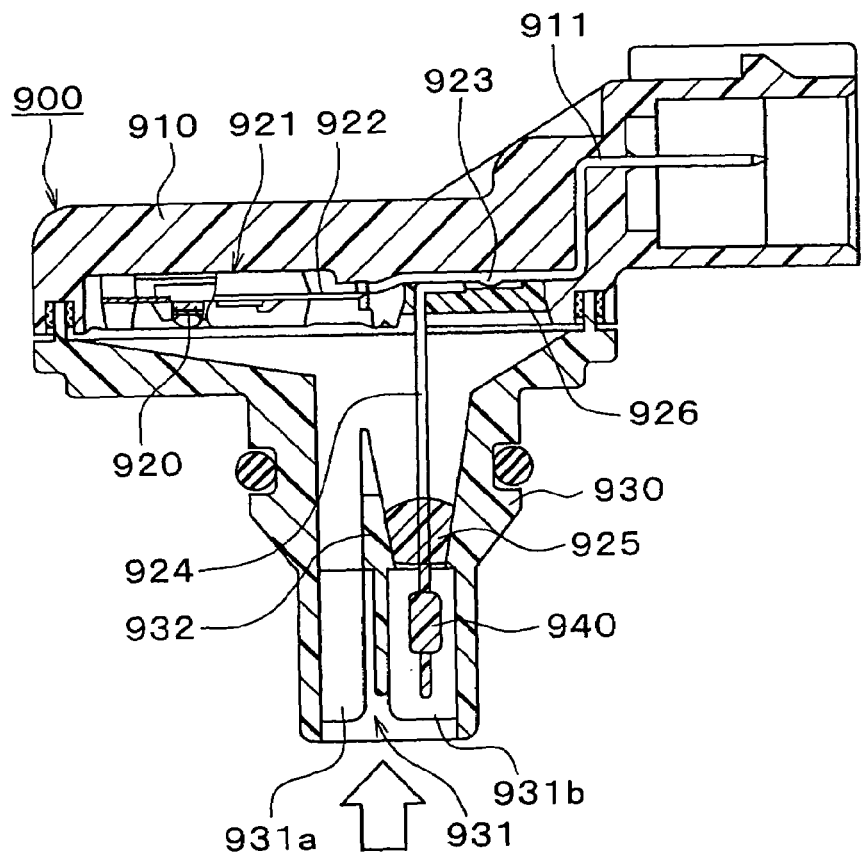
FIG. 4 is a cross-sectional view of a pressure sensor according to a related art.

In the pressure sensor 100, parts of the terminals 11 are passed through the pressure receiving hole 31 and electrically connected to the temperature sensing element 40. The extending portions 11a function as lead wires. Thus, the pressure sensor 100 does not require lead wires. Moreover, the pressure sensor 100 does not require a potting member for protecting a connecting point of a lead wire used in the related art shown in FIG. 4.

The extending portions 11a are held with the material forming the case 10 and therefore protected from corrosion or grime. Furthermore, they are reinforced with the material and therefore their resistance to vibration or hard environment is ensured. The extending portions 11a are easily formed at the same time when the case 10 is formed. Thus, the potting members around bases of the extending portions 11a or supporting members for supporting the extending portions 11a, such as a shock absorbing member 925, are not necessary. Vibrations of the temperature sensing element 40 are properly suppressed with a simple configuration in the pressure sensor 100.

A manufacturing process of the pressure sensor 100 can be simplified since the configuration of the pressure sensor 100 is simplified. Namely, the pressure sensor 100 can be provided at low cost. Moreover, the temperature sensing element 40 is arranged in a small space divided by the dividing plate 32 inside the pressure receiving hole 31. Thus, the temperature sensing element 40 is less likely to be largely displaced due to vibrations, and the amount of displacement is small even when the displacement occurs.

Figure 3A:
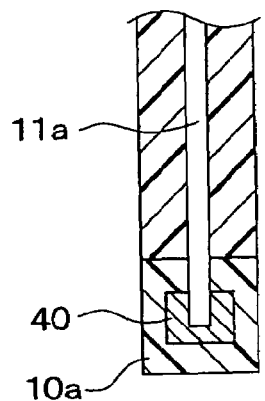
FIG. 3A is a partial cross-sectional view of the pressure sensor according to a modification of the embodiment.
Figure 3B:
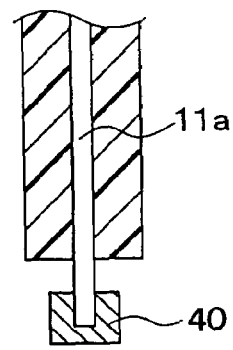
FIG. 3B is a partial cross-sectional view of the pressure sensor according to a modification of the embodiment.

The present invention should not be limited to the embodiment previously discussed and shown in the figures, but may be implemented in various ways without departing from the spirit of the invention. For example, a part of the extending portion 11a at which the temperature sensing element is arranged may be sealed with a sealing member 10a after the case 10 is formed as shown in FIG. 3A. The sealing member 10a may be made of the same material as that of the case 10 or a different material including an epoxy resin. The part of the extending portion 11a may be exposed without sealing. The case 10 can be made of materials other than resins as long as the terminals 11 can be assembled to the case 10 by insert molding.

The pressure receiving hole 31 may be formed without the dividing plate 32 as long as a part of each terminal 11 has the extending portion 11a that is sealed with the material forming the case 10, and the temperature sensing element 40 is connected to the end of the extending portion 11a. With this configuration, the lead wires and members that protect the lead wires are eliminated while the vibration resistance of the extending portions 11a is properly provided with a simple configuration.

What is claimed is:

1. A pressure sensor having an integrated temperature sensor, comprising:
   a case;
   terminals assembled to the case by insert molding and connectable to an external device;
   a pressure sensing element for detecting a pressure, the pressure sensing element electrically connected to the terminals and housed in the case;
   a port having a pressure receiving hole through which a pressure transmitting medium is led to the pressure sensing element, and connected to the case; and
   a temperature sensing element for detecting a temperature of the pressure transmitting medium, the temperature sensing element electrically connected to the terminals and arranged in the pressure receiving hole, wherein
   the terminals have parts that are passed through the pressure receiving hole and extended to the temperature sensing element,
   the extended parts of the terminals are formed as insert molding portions of the case and held with a material forming the case, and
   the extended parts of the terminals are electrically connected to the temperature sensing element.

2. The pressure sensor according to claim 1, wherein the case is made of resin.

3. The pressure sensor according to claim 1, further comprising a dividing plate in the pressure receiving hole, wherein:
   the dividing plate is arranged along a path in which the pressure transmitting medium is led and such that at least a part of the pressure receiving hole is divided by the dividing plate; and
   the temperature sensing element is arranged in a space divided by the dividing plate.

4. The pressure sensor according to claim 1, wherein the temperature sensing element is arranged at ends of the extended parts of the terminals and held with the material forming the case.

5. The pressure sensor according to claim 1, wherein:
   the extended parts have exposed ends; and
   the temperature sensing element is arranged at the exposed ends.

6. The pressure sensor according to claim 1, wherein:
   the extended parts have exposed ends;
   the temperature sensing element is arranged at the exposed ends; and
   the exposed ends and the temperature sensing element are sealed with a sealing member.

* * * * *